455-612 AU 233 EX
6/8/82 XR 4,334,321

United States Patent [19]

Edelman

[11] 4,334,321

[45] Jun. 8, 1982

[54] OPTO-ACOUSTIC TRANSDUCER AND TELEPHONE RECEIVER

[76] Inventor: Seymour Edelman, 9115 Glenridge Rd., Silver Spring, Md. 20910

[21] Appl. No.: 226,447

[22] Filed: Jan. 19, 1981

[51] Int. Cl.$^3$ .............................................. H04B 9/00

[52] U.S. Cl. .................................. 455/614; 455/612; 455/619; 350/96.29; 179/110 R

[58] Field of Search ........................ 455/614, 612, 619; 350/96.1, 96.13, 96.29; 179/110 R, 113, 121 R

[56] References Cited

U.S. PATENT DOCUMENTS

| | | | |
|---|---|---|---|
| 254,642 | 3/1882 | Hale | 179/110 R |
| 345,084 | 7/1886 | Spaulding | 179/110 R |
| 3,175,088 | 3/1965 | Herriott | 455/614 |
| 3,314,306 | 4/1967 | Alabaster et al. | 74/106 R |
| 3,466,446 | 9/1969 | Fassett | 455/614 |
| 4,002,897 | 1/1977 | Kleinman et al. | 455/619 |
| 4,310,731 | 1/1982 | Carlsen | 179/110 R |

*Primary Examiner*—Robert L. Griffin
*Assistant Examiner*—Edward L. Coles, Sr.
*Attorney, Agent, or Firm*—Brady, O'Boyle & Gates

[57] ABSTRACT

An optical fiber element of low density, low heat capacity, a large coefficient of thermal expansion, and a large Young's modulus varies in light transmissivity gradually between its ends from high transmissivity to opacity, whereby power modulated light transmitted through the fiber element is absorbed to cause a change in temperature of the fiber element and a resultant thermal expansion and contraction thereof. As a transducer in a telephone receiver, a light absorbing fiber element or group of such elements is coupled between the optical fiber waveguide in the receiver and a resiliently mounted acoustical diaphragm which is caused to respond over the audible range.

14 Claims, 5 Drawing Figures

FIG.1
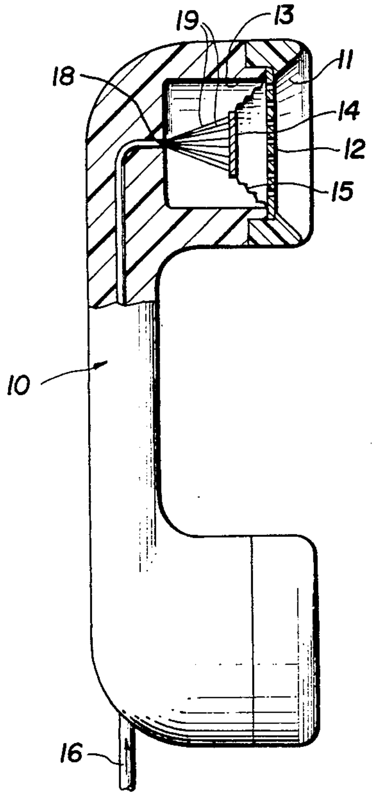
FIG.4
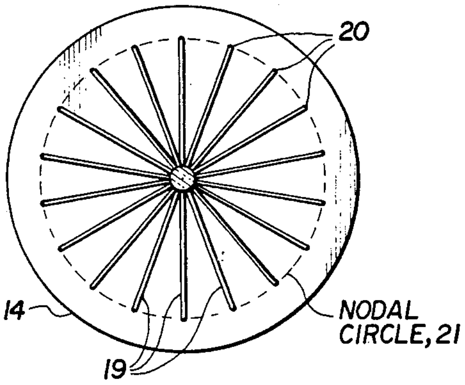
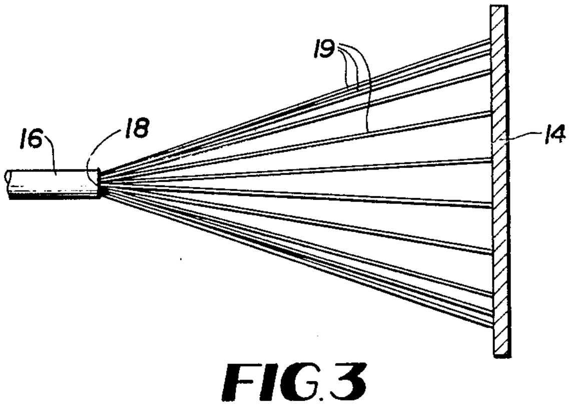
FIG.3
FIG.2
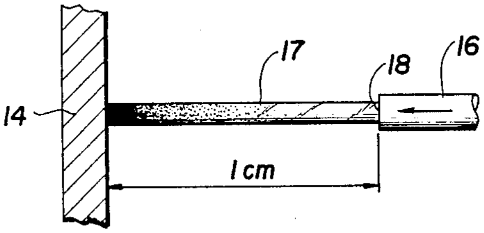
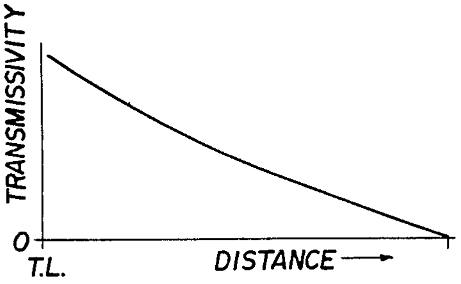
FIG.5

OPTO-ACOUSTIC TRANSDUCER AND TELEPHONE RECEIVER

BACKGROUND OF THE INVENTION

In its broadest aspect, the present invention relates to an optical fiber transducer element whose light transmissivity and therefore its ability to absorb transmitted light changes in a smooth and gradual manner from end-to-end. Such an optical fiber transducer formed of material, such as certain polymers characterized by low density, low heat capacity, high coefficient of thermal expansion and a large Young's modulus, can be employed singly or in a group in a telephone receiver to produce vibration of an acoustical diaphragm over the audible range, in accordance with a more specific aspect of the invention. The linear thermal elongation and contraction of the light absorbent optical fiber element coupled between the diaphragm and the receiver terminal of the incoming optical fiber waveguide drives the diaphragm, which is resiliently mounted, in the audible frequency range from 300 Hz to 3300 Hz.

Opto-acoustical telephones are known in the prior art and are discussed in U.S. Pat. No. 4,002,897, Kleinman et al. This patent discloses a telephone receiver for converting optical signals through an optical fiber waveguide into audible acoustic signals including a small optical absorption chamber filled with optical absorbing material, such as dark fibrous material.

An object of the present invention is to simplify and improve on the construction of an opto-acoustic telephone receiver as exemplified in the Kleinman et al. patent, so as to render this type of telephone more practical, more economical to manufacture, and more reliable and efficient in its operation.

Prior U.S. Pat. No. 345,084, Spaulding, discloses an early sound transmitting and receiving device employing a longitudinally extensible and contractable carbon pencil-like rod element which is electrically stimulated. U.S. Pat. No. 254,642, Hale, discloses a telephone receiver having an elongated extensible and contractable iron core surrounded by a current carrying coil and coupled with a vibratory element. U.S. Pat. No. 3,314,306, Alabaster et al., shows an early electromagnetic telephone receiver having a resonant iron core element coupled to a resonant disc or diaphragm.

An important object of the invention is to provide an optical transducer for use in a telephone receiver or the like which can eliminate the necessity for copper wiring in the receiver and which renders the receiver more compatible with fiber optics transmission cables coming into wide usage.

Other objects and advantages of the invention will become apparent during the course of the following detailed description.

BRIEF DESCRIPTION OF THE DRAWINGS

FIG. 1 is a side elevation, partly in cross section, of a telephone receiver embodying the present invention.

FIG. 2 is an enlarged partly schematic elevational view of an opto-acoustic transducer embodied in the invention.

FIG. 3 is a similar view showing a modified transducer formed by a group of optical fibers.

FIG. 4 is an end elevational view of the arrangement in FIG. 3.

FIG. 5 is a graph depicting decrease in light transmissivity through an optical fiber in accordance with the invention as distance increases.

DETAILED DESCRIPTION

Referring to the drawings in detail wherein like numerals designate like parts, a telephone receiver 10 includes an earpiece 11 having a customary screen 12 at the forward end of a chamber 13 in which a stiff lightweight diaphragm 14 is floatingly supported on a bellows-type spring 15 in spaced relation to the screen 12. An optical fiber line or waveguide 16 leading into the receiver 10 terminates centrally at the rear of chamber 13 in coaxial alignment with the diaphragm 14 which is disc-like.

As depicted in FIG. 2, a single optical fiber element 17 forming a component of the waveguide 16 and preferably having a length of approximately 1 cm extends from the terminal 18 of the waveguide 16 in the receiver to a central point on the diaphragm 14 and is attached to the diaphragm at this point to form a transducer element.

Alternatively, as depicted in FIGS. 1, 3 and 4, a bundle of optical fibers 19 having approximately the same lengths as the fiber 17 can be connected between the terminal 18 of the waveguide and plural circumferentially spaced attachment points 20 on a nodal circle 21 chosen for optimum resonance. Preferably, the radius of the nodal circle 21 is approximately equal to 0.68 of the radius of the disc or diaphragm 14. The optical fibers 19 are components of the optical fiber waveguide 16.

Preferably, the fibers 17 or 19 are formed from polymers although they may be glass fibers. The desired parameters for the fibers employed are low density, low heat capacity, large coefficient of thermal expansion, and a large Young's modulus. Suitable polymers include polyvinylidene fluoride, polyvinylchloride, and polystyrene.

Each fiber 17 or 19 is treated by a well-known technique, for example, by ultra-violet radiation, so that its light transmissivity changes smoothly and gradually in a nearly linear manner or exponentially between the terminal 18 and its point of attachment to the diaphragm 14. More particularly, at its rear terminal 18, the optical fiber is highly transmissive of power modulated light while at its forward end adjacent to the diaphragm 14 it is opaque or non-transmissive. This renders the optical fiber absorbent of light energy with the result that the fiber or fibers are cyclically heated and cooled and caused to thermally expand and contract longitudinally as monochromatic light is transmitted to them by the waveguide 16. However, in both embodiments, the spring 15 and the optical fiber elements 17 and 19 are arranged so that the spring is in compression while the optical fiber elements or element are in tension.

Accordingly, thermal expansion and contraction of a single centrally located fiber 17 or the multiple fibers 19 attached at the nodal circle 21 of the diaphragm produces sound due to diaphragm vibration. The suspension of the diaphragm 14 on the bellows spring 15 facilitates proper response of the diaphragm to the expansion and contraction of the fiber 17 or plural fibers 19 acting as a transducer. The mass of the diaphragm, and the spring constant and damping factor of the bellows 15, are selected so that the combination will provide a range of relatively good audio fidelity between 300 and 3300 Hz, which is the normal audible range utilized in telephony.

FIG. 5 of the drawings graphically shows the gradual, smooth and roughly linear decrease in light transmissivity through the short fiber 17 or 19 from points of high transmissivity to complete opacity. This allows complete absorption by the fiber of the light energy without reflection.

It can now be stated that the invention above-described possesses the ability to convert audio-frequency signals transmitted by optical fibers as power-modulated light into soundwaves in a telephone earpiece. The essence of the invention lies in the ability of the fiber having gradually diminishing light transmissivity to absorb the modulated light in a short transition length of the fiber coupled between the vibratory diaphragm and the receiver terminal of the optical fiber telephone line or waveguide. Responding to the absorbed light, the fiber thermally expands and subsequently cools and contracts and is thus enabled to drive the diaphragm in vibration.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A transducer element for use in a telephone receiver or the like including sound producing means and comprising at least an optical fiber element adapted to transmit and absorb modulated light and having its light transmissivity gradually decreasing from a high level at one end of the fiber element to substantially zero transmissivity at the other end of the element, whereby modulated light absorbed by the fiber element causes thermal expansion and contraction of the element longitudinally for driving said sound producing means.

2. A transducer element as defined in claim 1 in which the fiber element is formed of a polymer having low density, low heat capacity, a large coefficient of thermal expansion and a large Young's modulus.

3. A transducer element as defined in claim 2, and said polymer comprising a polymer taken from the group consisting of polyvinylidene fluoride, polyvinylchloride and polystyrene.

4. A transducer element as defined in claim 2, and said fiber element having a length of approximately 1 cm.

5. A telephone receiver including an earpiece, a transmission line for modulated light leading to the earpiece, acoustic transducer means resiliently mounted on the earpiece, and at least one optical fiber transducer element connected between said transducer means and a terminal point on said transmission line, said optical fiber transducer element having diminishing modulated light transmissivity between its ends and expanding and contracting lengthwise to drive said transducer means in response to absorption of modulated light by the transducer element.

6. A telephone receiver as defined in claim 5, and said one optical fiber transducer element comprising an approximately 1 cm long element connected between said terminal point and the center point of said transducer means.

7. A telephone receiver as defined in claim 5, and a plurality of substantially equal length optical fiber transducer elements in circumferentially spaced relationship connected between said terminal point and points on a nodal circle of the transducer means located to produce an optimum mode of vibration.

8. In a telephone receiver, a resiliently supported earpiece acoustic transducer means, a transmission line for modulated light connected with the receiver and having an end portion spaced from said transducer means, and optical fiber light absorbing thermally expansible and contractable transducer means connected between said end portion and said acoustic transducer means to drive the latter.

9. In a telephone receiver as defined in claim 8, said expansible and contractable transducer means being formed of a polymer having a low density, low heat capacity, a large coefficient of thermal expansion and a large Young's modulus.

10. In a telephone receiver as defined in claim 9, and said expansible and contractable transducer means comprising a polymer taken from the group consisting of polyvinylidene fluoride, polyvinylchloride and polystyrene.

11. In a telephone receiver as defined in claim 8, and said acoustic transducer means includes a diaphragm.

12. In a telephone receiver as defined in claim 11, and a compression spring means supporting said diaphragm.

13. In a telephone receiver as defined in claim 12, and the compression spring means comprising a bellows spring member.

14. In a telephone receiver as defined in claim 12, wherein said optical fiber transducer means is connected in tension between said end portion and said diaphragm.

* * * * *